United States Patent [19]
Chou

[11] Patent Number: 6,031,640
[45] Date of Patent: *Feb. 29, 2000

[54] SCANNER DRIVING APPARATUS

[75] Inventor: Chih-Rong Chou, Taichung, Taiwan

[73] Assignee: Mustek Systems Inc., Hsinchu, Taiwan

[*] Notice: This patent issued on a continued prosecution application filed under 37 CFR 1.53(d), and is subject to the twenty year patent term provisions of 35 U.S.C. 154(a)(2).

[21] Appl. No.: 08/922,474

[22] Filed: Sep. 3, 1997

[51] Int. Cl.⁷ ...................................................... H04N 1/04
[52] U.S. Cl. ............................ 358/498; 358/496; 358/497
[58] Field of Search .................................... 358/498, 497, 358/496, 474, 473; 399/208, 210, 211; 74/89.15; 382/321, 323, 135

[56] References Cited

U.S. PATENT DOCUMENTS

| | | | |
|---|---|---|---|
| 5,022,019 | 6/1991 | Motoyoshi et al. | 369/36 |
| 5,805,561 | 9/1998 | Pollard | 369/178 |
| 5,818,611 | 10/1998 | Shih | 358/474 |
| 5,845,180 | 12/1998 | Tsai | 399/211 |

*Primary Examiner*—Joseph Mancuso
*Assistant Examiner*—Vikkram Bali
*Attorney, Agent, or Firm*—McDermott, Will & Emery

[57] ABSTRACT

The present invention discloses a scanner driving apparatus for scanning a scanned document by applying a screw or a ball screw as dynamics' transference mechanism. Not only significantly upgrades the scanning range of the scanner, but the scanning accuracy of the scanner can be precisely controlled.

14 Claims, 7 Drawing Sheets

SCANNER DRIVING APPARATUS

CROSS REFERENCE TO RELATED APPLICATION

The invention is related to another U.S. patent application entitled "Built-in Scanner for Multiple Materials Documents" assigned to same assignee as the present application and incorporated herein by reference in its entirety.

BACKGROUND OF THE INVENTION

1. Field of the Invention

The present invention relates to a scanner driving apparatus for scanning a scanned document by applying a screw (or a ball screw) as dynamics' transference mechanism. Effective scanning range is significantly upgrades, and the scanning accuracy of the scanner can be precisely controlled.

2. Description of the Prior Art

In the present days, many kinds of products are produced and modified each day, and a similar progress also occurs in optical systems such as scanners. There is a trend of mounting a scanner with higher resolution inside a computer case as a standard equipment.

Rollers are conventionally used to feed the scanned document into the scanner, which usually damages the surfaces of the scanned document when the scanned document is feeding. However, the roller-feeding scanner can not scan transparent documents such as lantern slides, and the rollers are easily dirtied by dust that will generate black or unusual color lines in images. In addition, the sizes of the mechanical and optical components are not effectively degraded for achieving the purpose of mounting inside the computer case.

Another common scanning scheme is to put the scanned document inside a tray (or a cassette), and then feeds the scanned document for scanning. The tray (or the cassette) prevents the surface of the scanned document from damaging by directly contacting. Paper jam that usually occurs in the roller-feeding scanner is also overcome. Furthermore, the scheme does not need to clean dust frequently as the roller-feeding scanner does, and the convenience of operation is apparently upgrading.

A transmission axis applied in a conventional scanner usually constrains scanning range of a scanner. FIGS. 5A and 5B respectively represent a cross-sectional and a top view of the conventional scheme while applying the transmission axis and a wire as dynamics' transference mechanism. A tray 501 connects the wire 503 with a fix 506 and a support 504, wherein the fix 506 receives the dynamics from the wire 503, and the support 504 is used as support mechanism. Under controlled by the fix 506, the tray 501 gets in and out of the scanner. All the allocations of the gear sets 502, the wire 503, the transmission axis 505, and the support 504 are outside the tray 501, which constrain the effective scanning range of the traditional scanner.

All skilled know that the sizes of the gear sets and the motors must follow a certain constraint, and furthermore, the sizes of the optical elements can not be effectively reduced. It implies that almost all the build-in scanners with the scanning area about 4 inches×6 inches. What is clearly needed is a scanner being capable of larger scanning range and more accurate control.

SUMMARY OF THE INVENTION

The principal object of the present invention is to provide a scanner being effectively upgraded scanning range.

The other object of the invention is to provide the scanner being capable of reducing the required elements of the dynamics' transference mechanism.

A further object of the invention is to provide the scanner being capable of upgrading accuracy of operation controls.

According to the above-mentioned objects, the invention discloses a scanner applying a screw (or a ball screw) as dynamics' transference mechanism for feeding the tray into the scanner. The transmission axis and the wire usually used in a conventional scanner are unnecessary. The dynamics' transference mechanism of applying the screw (or the ball screw) can control the scanning operations more accurately than the traditional. The scanning range is also increased based on the screw (or the ball screw) being allocated under the tray.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1A:
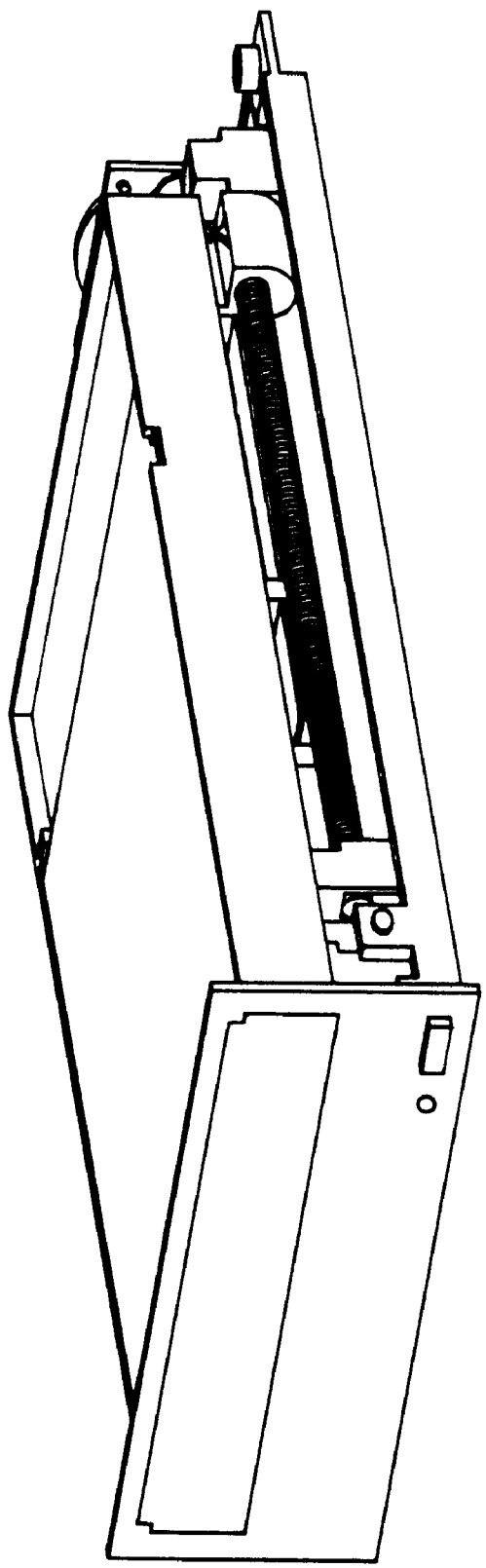
FIG. 1A is a perspective view representative of a scanner with driving apparatus according to the invention, which is the first embodiment of the invention.
Figure 1B:
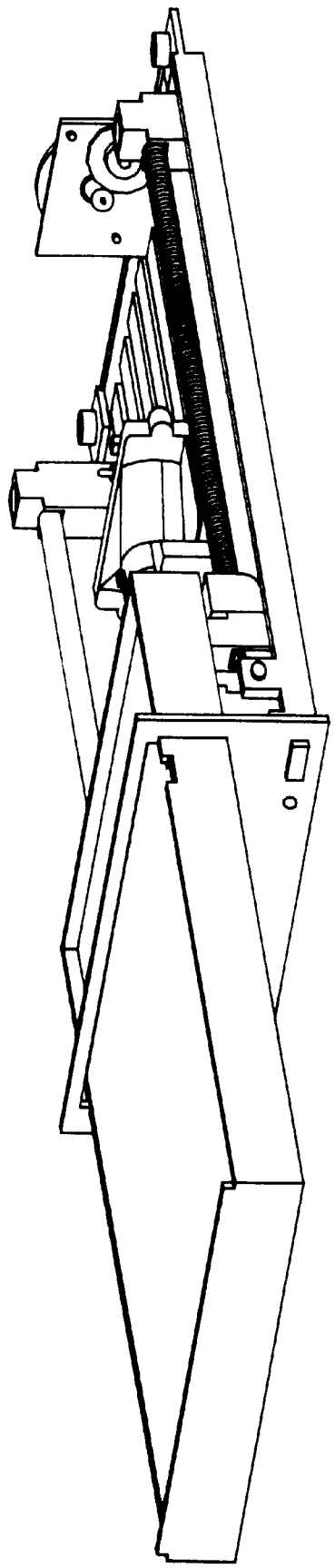
FIG. 1B is a perspective view when the tray gets out of the scanner.

FIG. 1A represents a perspective view illustrative of the scanner with driving apparatus according to the invention. FIG. 1B is a perspective view when the tray gets out of the scanner. Referring to the FIG. 1B, almost the whole tray can be exposed outside the scanner as to facilitate the operations of putting the scanned document into the tray. Moreover, the scanner can be mounted inside a computer case by using a housing device.

Figure 2A:
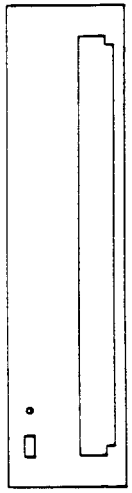
FIG. 2A represents a cross-section on right side of the scanner in the FIG. 1A.
Figure 2B:
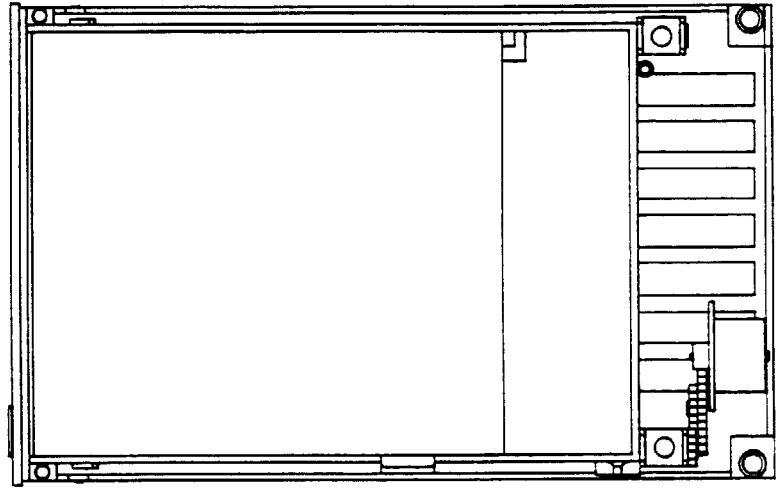
FIG. 2B illustrates a top cross-section of the scanner in the FIG. 1A.
Figure 2C:
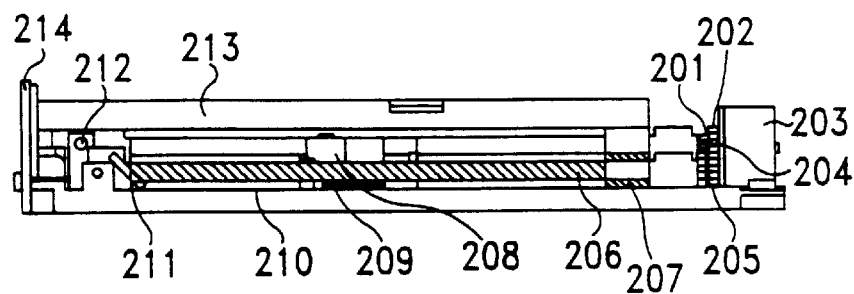
FIG. 2C describes a side cross-section of the scanner in the FIG. 1A.

FIGS. 2A, 2B and 2C show right side, top, and side cross-section representative of the first embodiment, respectively. By applying gear sets 201 and 202, and warm gears 204 and 205, dynamics can be transferred from the motor 203 to the screws (or ball screws) 206 and 207 for getting the tray 213 in and out of the scanner. When the scanned document is feeding for scanning, the light source 212 illuminates a light beam projected on the surface of the scanned document, then reflected against on the scanned document to the mirror 211. The mirror 211 is used to guide the reflected light and penetrates the lens 208 to the image sensor of the scanner. A mask 209 can prevent the light beam from penetrating the lens 208 if necessary, and plate 214 can prevent the scanner being dirtied by dust. A PCB (Printed Circuit Board) 210 contains control circuit for controlling scanning operations. The motor 203 lies down and accompanies with the gear sets 201 and 202 standing erect to connect the screws 206 and 207 with a rod for transferring dynamics.

Figure 3A:
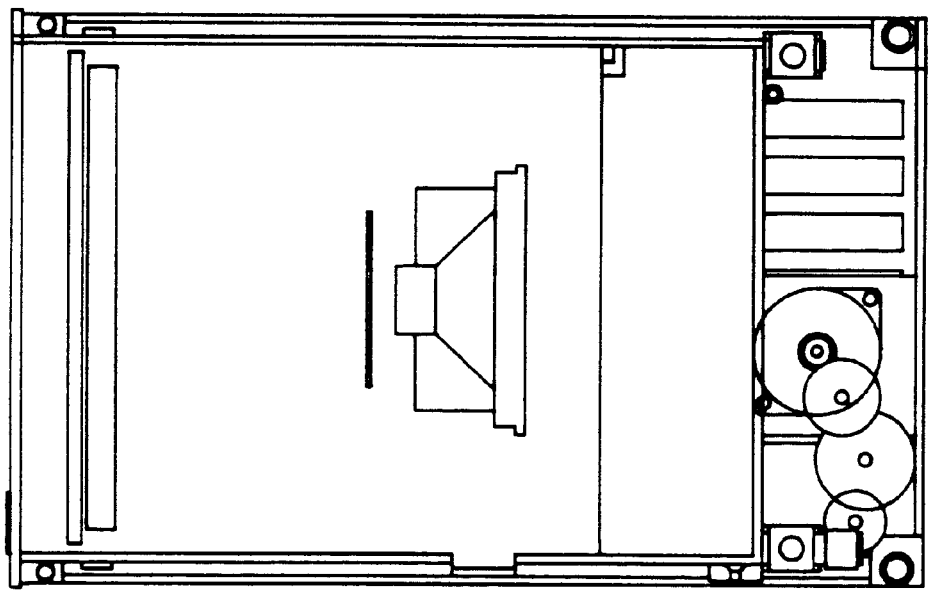
FIG. 3A is a top cross-section of the second embodiment of the invention.
Figure 3B:
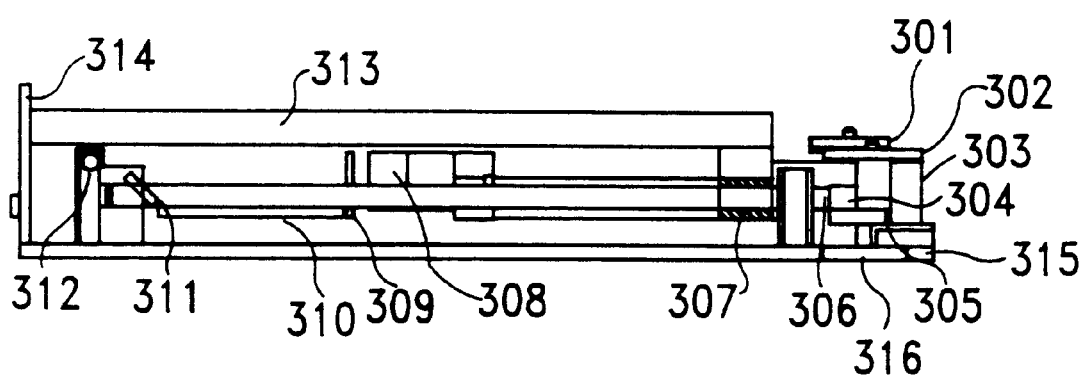
FIG. 3B is a side cross-sectional view of the second embodiment.
Figure 3C:
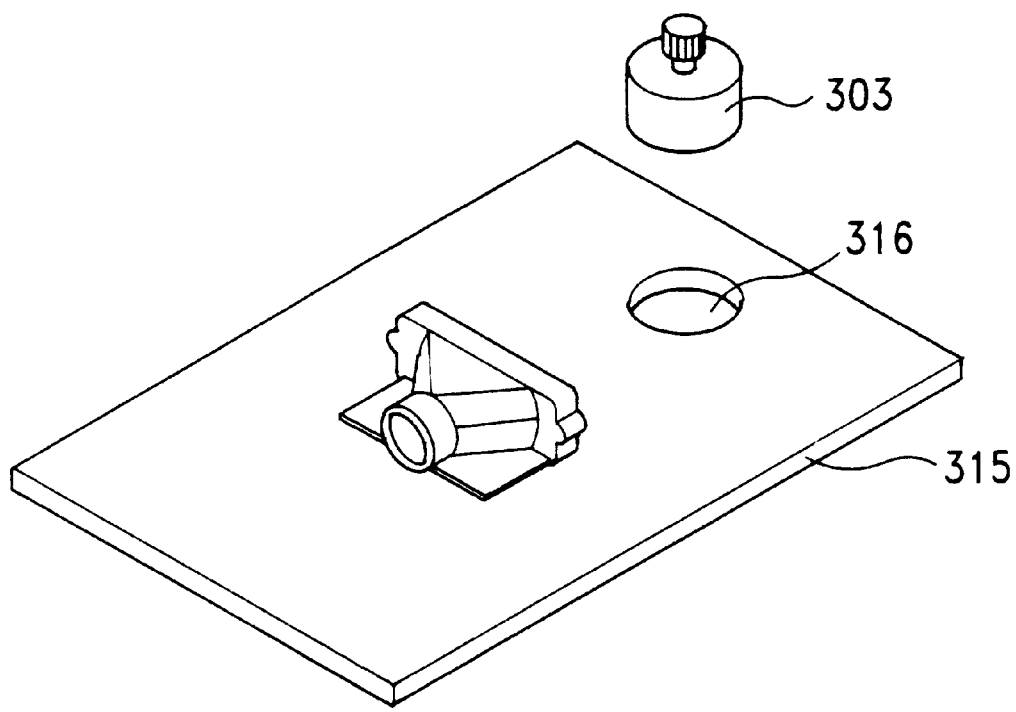
FIG. 3C illustrates a perspective view for allocating a motor in the base of the second embodiment.
Figure 3D:
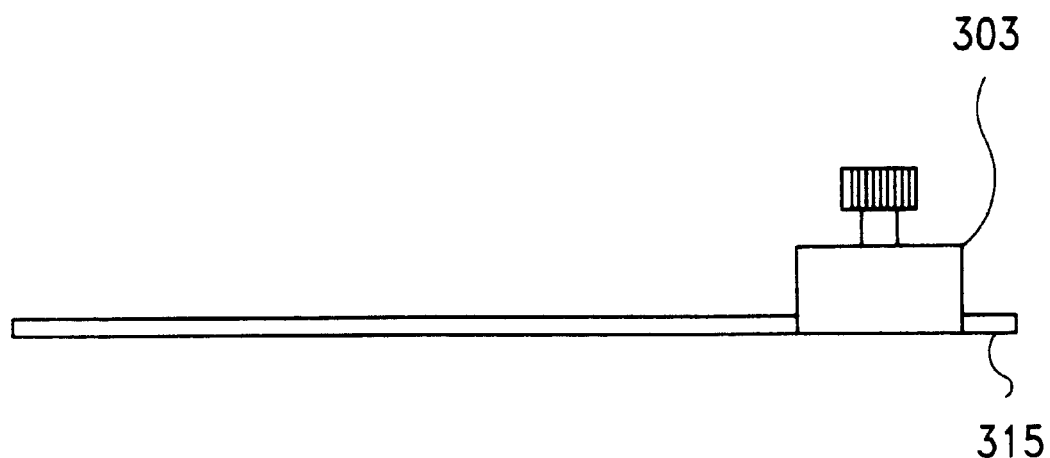
FIG. 3D describes the cross-section for representing the allocation in the FIG. 3C.

FIGS. 3A and 3B illustrate the top and side cross-sections of the second embodiment, respectively. FIGS. 3C and 3D respectively represent the perspective and the cross-sectional views for allocating the motor. FIG. 3D describes the cross-section for representing the allocation in the FIG. 3C. Applications of the principal elements such as gear sets 301 and 302, motor 303, warm gears 304 and 305, screws (or ball screws) 306 and 307, a lens 308, a mask 309, a PCB 310, a mirror 311, a light source 312, a tray 313, and a plate 314 are the same as the applications described in the first embodiment. Please note that the motor 303, the gear sets 301 and 302, and the warm gears 304 and 305 are allocated back side of the scanner. Therefore, almost whole the tray 313 can be exposed outside the scanner for putting the scanned document conveniently. The motor 303 stands erectly and accompanies with the gear sets 301 and 302 lying down to connect the screws 306 and 307 with a rod for transferring dynamics. Please note that the base 315 of the scanner of the second embodiment contains a hole 316, which is used to inlay the motor 303 for achieving the purpose of lowering the scanner height. The allocation of the motor 303 is completed illustrated in the FIGS. 3C and 3D.

Please note that the imaging sensors in the embodiments are based on a well-known CCD (Charge Coupled Device) structure, other image sensor such as CIS (Contact Image Sensor) can be applied to replace the CCD imaging structure. Other devices used in a generic scanner also can be applied in the embodiment, such as applying a cassette in stead of the tray, and applying lamps as light source in the scanner. In addition, the screws are allocated under the tray, which indicates that the length of the tray is enlarged, and thus increases the effective scanning range.

Figure 4A:
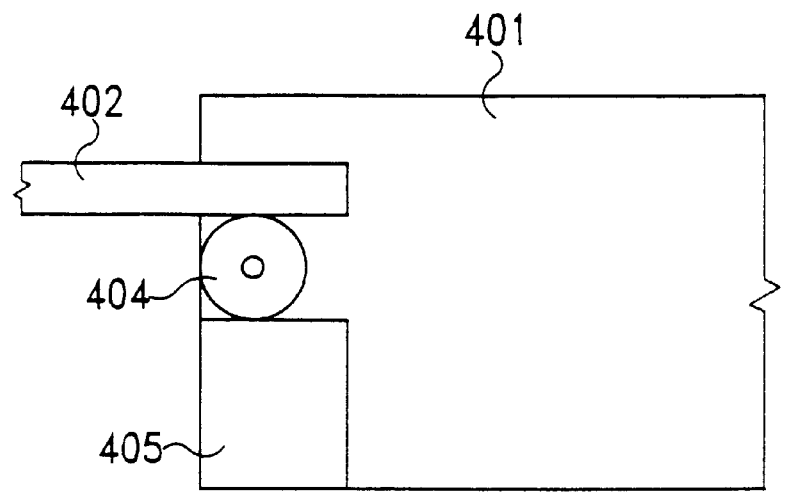
FIG. 4A represents a cross-section for describing the operations of getting the tray out of the scanner conventionally.

Referring to FIG. 4A, which illustrates a cross-sectional view illustrative of the scanner 401 when the tray 402 is getting out of the scanner 401 for receiving the scanned document conventionally. It is obvious that partial end of the tray 402 still stays inside the scanner, and the length of the partial end is concerned with the lengths of the gear 404 and the motor 405. However, the lengths of the gear 404 and the motor 405 are at least three (3) centimeters, which also constrains the length of the partial end.

Figure 4B:
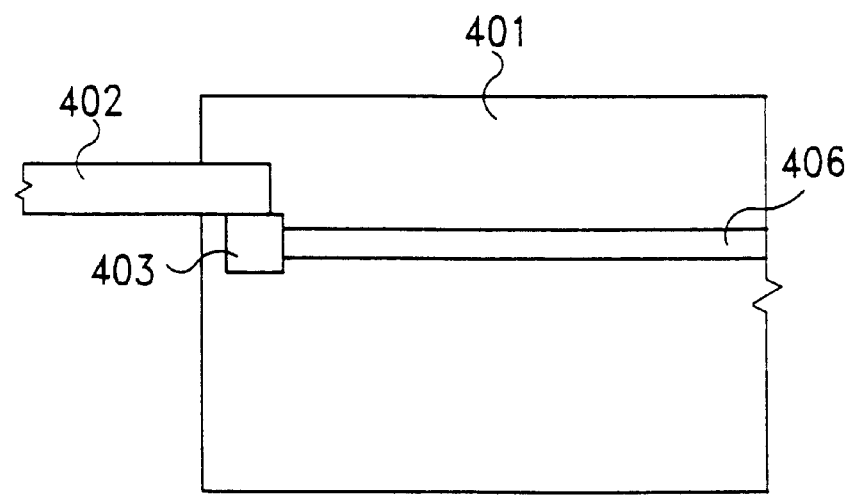
FIG. 4B describes a cross-section for representing the operations of getting the tray out of the scanner according to the invention.
Figure 5A:
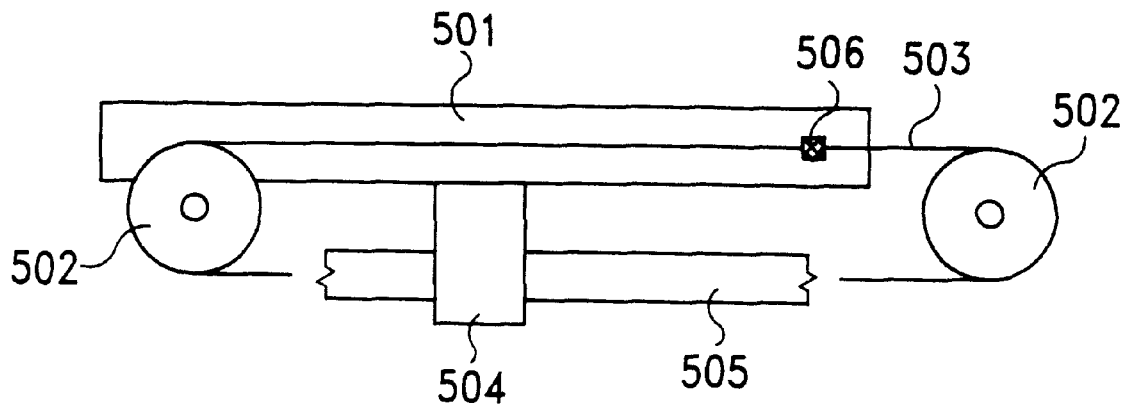
FIG. 5A illustrates a side cross-section for describing the operations of transferring dynamics by using a transmission axis and a wire.
Figure 5B:
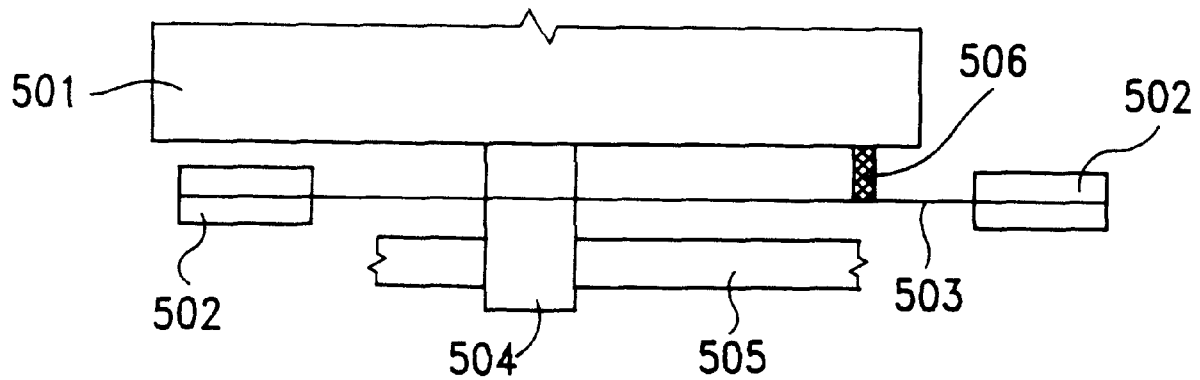
FIG. 5B illustrates a top view cross-section for describing the operations of transferring dynamics according to the FIG. 5A.

Referring to FIG. 4B, which describes the cross-section of the scanner 401 when the tray 402 is getting out of the scanner 401 for receiving the scanned document by applying a screw 406 as dynamics' transference mechanism. Although parts of the tray 402 also remains inside the scanner, yet the remainder parts are concerned with the lengths of the fix 403, which is only about 5 millimeters. The tray length that always stays inside the scanner of the invention is clearly shorter than the conventional scanner. Furthermore, that the screw allocated under the tray implies the tray width can be further increased, which also upgrades effective scanning range.

In addition, more process accuracy can be achieved by applying a ball screw instead of the screw. Spaces inside the ball screw are filled by additional balls for accurately controlling the operations of screwing. Anyway, the wire and the transmission axis of the traditional scanner are replaced by applications of the screw and the ball screw, which also reduces total element quantities for upgrading combination convenience.

In conclusion, the present invention discloses a scanner driving apparatus for scanned documents by applying a screw (or a ball screw) as dynamics' transference mechanism. The effective scanning range is significantly upgrades, and scanning accuracy of the scanner can be precisely controlled.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A scanning apparatus for scanning a document, wherein said scanning apparatus comprises,
    inputting means having a tray for feeding said document into said scanning apparatus;
    image scanning means fixed inside of said scanning apparatus for generating image information of said document while said document being fed; and
    transferring means for controlling operations of passing said document through said image scanning means by applying a screwing transference mechanism, wherein said screwing transference mechanism is allocated under an edge of said tray, said screwing transference mechanism connects with said tray through a fix for increasing scanning range of said scanning apparatus.

2. The scanning apparatus according to claim 1, wherein said inputting means comprises a tray.

3. The scanning apparatus according to claim 1, wherein said image scanning means comprises a contact image sensor.

4. The scanning apparatus according to claim 1, wherein said image scanning means comprises:
    light emitting means for projecting an illuminating light to said document, said document reflecting said light;
    reflecting means for reflecting said reflected light from said document; and
    image pick-up means for obtaining said image information.

5. The scanning apparatus according to claim 4, wherein said image pick-up means comprises a charge-coupled device.

6. The scanning apparatus according to claim 1, wherein said transferring means comprises:
    a motor for generating dynamics;
    a plurality of gear sets for transferring said dynamics;
    a screwing means for receiving said dynamics from said plurality of gear sets to control said operations of passing said document through said image scanning means.

7. The scanning apparatus according to claim 6, wherein said screwing means comprises a screw for applying said screwing transference mechanism.

8. The scanning apparatus according to claim 6, wherein said screwing means comprises a ball screw for applying said screwing transference mechanism.

9. A build-in scanning apparatus for scanning a document, said scanning apparatus comprises:

a housing device for mounting said scanning apparatus into a computer case;

inputting means having a tray for feeding said document into said scanning apparatus, said inputting means being mounted inside said housing device;

image scanning means mounted and fixed inside said housing device for generating image information of said document while said document being fed; and transferring means mounted inside said housing device for controlling operations of passing said document through said image scanning means by applying a screw as dynamics' transference mechanism, wherein said screw is allocated under an edge of said tray, said screw connects with said tray through a fix for increasing scanning range of said scanning apparatus.

10. The scanning apparatus according to claim 9, wherein said image scanning means comprises a charge-coupled device.

11. The scanning apparatus according to claim 9, wherein said image scanning means comprises a contact image sensor.

12. A build-in scanning apparatus for scanning a document, said scanning apparatus comprises:

a housing device for mounting said scanning apparatus into a computer case;

inputting means having a tray for feeding said document into said scanning apparatus, said inputting means being mounted inside said housing device;

image scanning means mounted and fixed inside said housing device for generating image information of said document while said document being fed; and transferring means mounted inside said housing device for controlling operations of passing said document through said image scanning means by applying a ball screw as dynamics' transference mechanism, wherein said ball screw is allocated under an edge of said tray, said ball screw connects with said tray through a fix for increasing scanning range of said scanning apparatus.

13. The scanning apparatus according to claim 12, wherein said image scanning means comprises a charge-coupled device.

14. The scanning apparatus according to claim 12, wherein said image scanning means comprises a contact image sensor.

* * * * *